US008868550B2

(12) United States Patent
Doppelt et al.

(10) Patent No.: US 8,868,550 B2
(45) Date of Patent: Oct. 21, 2014

(54) METHOD AND SYSTEM FOR PROVIDING AN ANSWER

(75) Inventors: Adam Doppelt, Seattle, WA (US); Ethan Lowry, Seattle, WA (US); Patrick O'Donnell, Seattle, WA (US)

(73) Assignee: CitySearch, LLC, West Hollywood, CA (US)

( * ) Notice: Subject to any disclaimer, the term of this patent is extended or adjusted under 35 U.S.C. 154(b) by 434 days.

(21) Appl. No.: 12/430,743

(22) Filed: Apr. 27, 2009

(65) Prior Publication Data

US 2010/0273139 A1   Oct. 28, 2010

(51) Int. Cl.
*G06F 17/30* (2006.01)
*H04L 29/08* (2006.01)
*H04W 4/02* (2009.01)
*G06Q 10/02* (2012.01)

(52) U.S. Cl.
CPC .................. *H04W 4/02* (2013.01); *H04L 67/18* (2013.01); *G06Q 10/02* (2013.01)
USPC .......................................... 707/724; 701/209

(58) Field of Classification Search
USPC ..................... 707/723–724; 701/209
See application file for complete search history.

(56) References Cited

U.S. PATENT DOCUMENTS

| 6,408,307 | B1* | 6/2002 | Semple et al. ......................... 1/1 |
| 6,785,671 | B1* | 8/2004 | Bailey et al. ................ 705/26.81 |
| 7,071,842 | B1* | 7/2006 | Brady, Jr. ....................... 340/988 |
| 7,589,628 | B1* | 9/2009 | Brady, Jr. ................. 340/539.11 |
| 7,847,684 | B1* | 12/2010 | Brady, Jr. ................. 340/539.11 |
| 7,876,214 | B1* | 1/2011 | Brady, Jr. ................. 340/539.11 |
| 7,876,215 | B1* | 1/2011 | Brady, Jr. ................. 340/539.11 |
| 7,911,335 | B1* | 3/2011 | Brady, Jr. ................. 340/539.11 |
| 7,945,548 | B2* | 5/2011 | Dalton et al. .................. 707/705 |
| 2003/0036848 | A1* | 2/2003 | Sheha et al. ................... 701/209 |
| 2004/0139105 | A1* | 7/2004 | Trepess et al. ............ 707/103 R |
| 2005/0108210 | A1* | 5/2005 | Wang et al. ........................ 707/3 |
| 2005/0234880 | A1* | 10/2005 | Zeng et al. ......................... 707/3 |
| 2006/0017692 | A1* | 1/2006 | Wehrenberg et al. .......... 345/156 |
| 2007/0005564 | A1* | 1/2007 | Zehner ............................... 707/2 |
| 2009/0005080 | A1* | 1/2009 | Forstall et al. .............. 455/456.3 |
| 2009/0144268 | A1* | 6/2009 | Nagase ............................. 707/5 |
| 2009/0307263 | A1* | 12/2009 | Skibiski et al. ............ 707/103 R |
| 2010/0079336 | A1* | 4/2010 | Skibiski et al. ........... 342/357.07 |
| 2010/0146445 | A1* | 6/2010 | Kraut ............................. 715/821 |
| 2010/0299317 | A1* | 11/2010 | Uy ............................... 707/706 |

\* cited by examiner

*Primary Examiner* — Joshua Bullock
(74) *Attorney, Agent, or Firm* — Stephen M. De Klerk

(57) ABSTRACT

A method of providing an answer, comprising receiving a criteria, identifying a subset of a set of answers in a data store based on the criteria, calculating a random value for each of the answers in the subset, ranking the subset of answers based on the random values, selecting one of the answers of the subset based on the ranking; and providing an output including the selected answer.

20 Claims, 11 Drawing Sheets

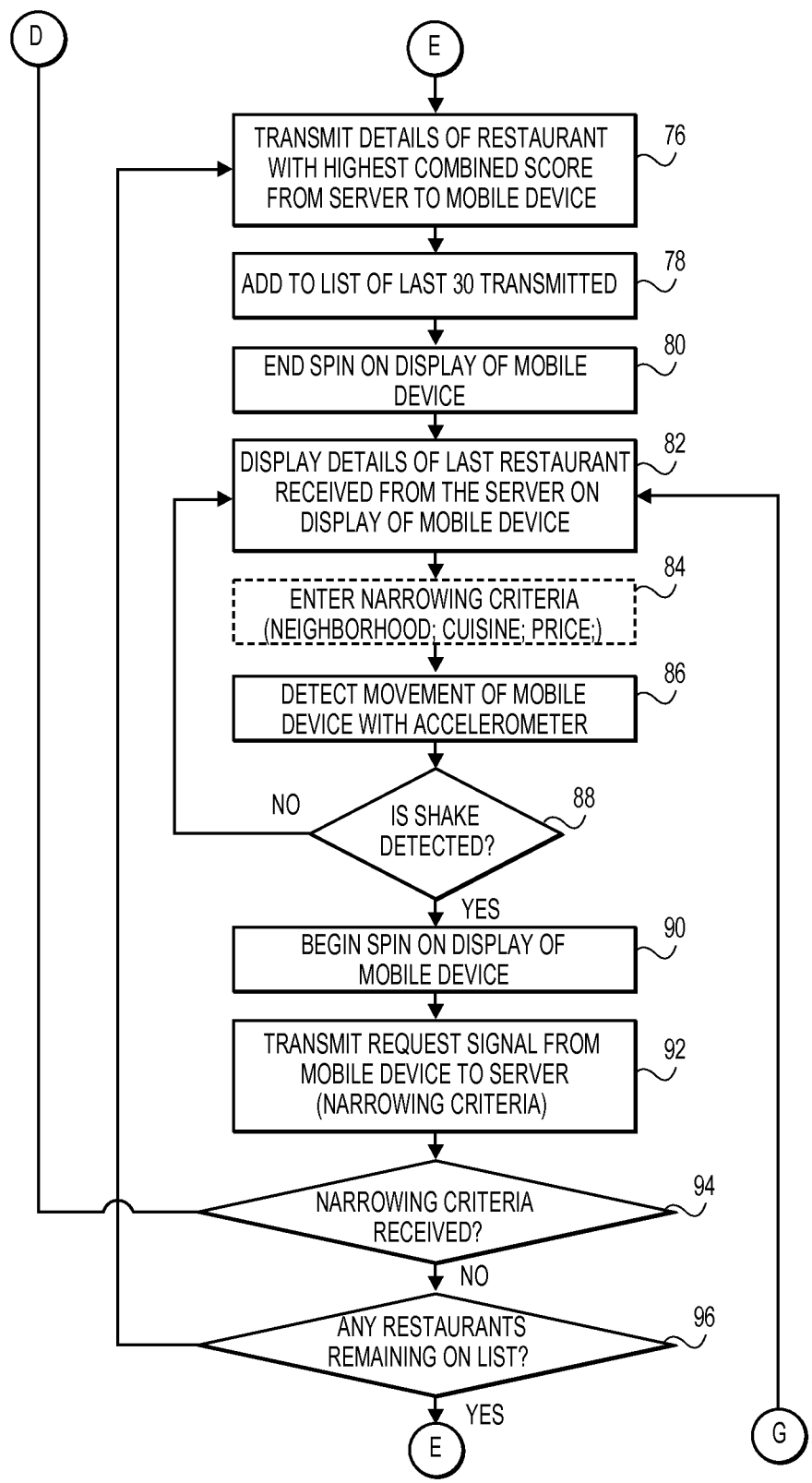

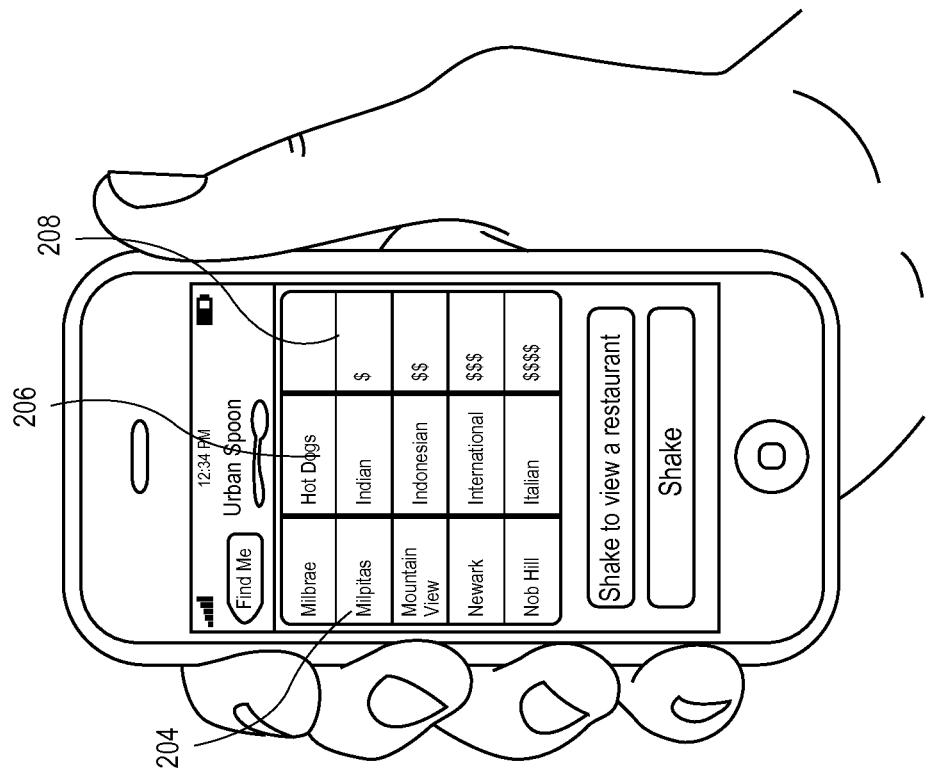
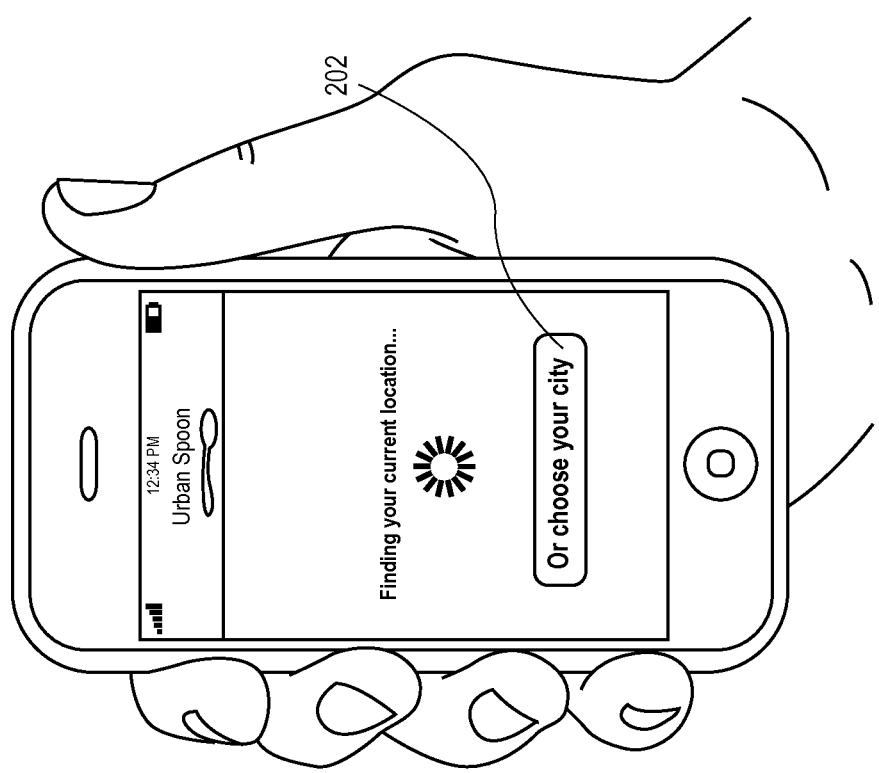
FIG. 2B
FIG. 2A

METHOD AND SYSTEM FOR PROVIDING AN ANSWER

BACKGROUND OF THE INVENTION

1). Field of the Invention

This invention relates to a method of providing an answer and to a related system.

2). Discussion of Related Art

The internet is often used to obtain an answer based on a criteria. For example, the internet can be used to find a restaurant based on an area, cuisine, price, etc. In many cases the closest restaurant that fits the criteria is ranked highest. Each restaurant may also have a popularity score associated therewith, in which case the restaurant that fits the criteria and has the highest popularity score is ranked highest. Successive searches based on the same criteria invariably render identical answers.

SUMMARY OF THE INVENTION

The invention provides a method of providing an answer including receiving a criteria, identifying a subset of a set of answers in a data store based on the criteria, calculating a random value for each of the answers in the subset, ranking the subset of answers based on the random values, selecting one of the answers of the subset based on the ranking and providing an output including the selected answer.

The method may include receiving a request signal including the criteria of a network at a server and transmitting a response signal including the selected answer in response to the request signal.

The criteria may include a GPS position of a mobile device.

The method may include receiving a narrowing criteria, the subset of answers being identified based on the narrowing criteria.

The narrowing criteria may include at least one of neighborhood, cuisine and price.

The narrowing criteria may include at least two of neighborhood, cuisine and price.

The method may include storing a position of each of the answers of the set, determining whether a position is based on a GPS position or whether the position is a selected area; if the position is based on a GPS position, calculating a distance from the position based on the GPS position to a position of each answer to determine a plurality of distances, obtaining a plurality of distance scores based on a ranking of the distances; if the position is based on a selected area, setting a distance score for all answers in a selected area at a first value and all answers outside the selected area at a second value and storing the distance scores, wherein the criteria includes the distance scores.

The method may include calculating a total score by combining the distance score and the random value for each answer and ranking the answers based on the total scores.

The method may include storing popularity scores of each of the answers, obtaining a total score for each answer by combining the random value and the popularity score for each answer and ranking the answers based on the total scores.

The selected answer may be the answer in the subset having the highest ranking, further including receiving a request signal; and in response to the request signal providing an output including a selected answer having the next highest ranking in the subset.

The selected answer may be the answer in the subset having the highest ranking, further including recording each answer that has been provided as an output; and limiting the subset of answers to exclude a last predetermined number of answers that have been provided as an output.

The method may include transmitting the criteria from a remote computer system, wherein the criteria is received at a server computer system.

The method may include entering a narrowing criteria on the remote computer system, the subset of answers being based on the narrowing criteria.

The remote computer system may be a mobile device.

The method may include utilizing a GPS module of the mobile device to determine a GPS position of the mobile device, the criteria including the GPS position of the mobile device.

The method may include detecting movement of the mobile device, determining whether acceleration of the mobile device is more than a predetermined threshold; and if acceleration of the mobile device is more than the predetermined threshold, transmitting the request signal from the mobile device to the server.

The method may include displaying a start screen on the display of the mobile device, the start screen including a wheel that is rotatable to select the criteria, spinning the wheel on the display if acceleration of the mobile device is more than the predetermined threshold, stopping rotation of the wheel in response to the output and displaying the output on the display.

The invention also provides a computer readable medium having stored thereon a set of instructions which are readable by a processor of a computer to execute a method of providing an answer, comprising receiving a criteria, identifying a subset of a set of answers in a data store based on the criteria, calculating a random value for each of the answers in the subset, ranking the subset of answers based on the random values, selecting one of the answers of the subset based on the ranking and providing an output including the selected answer.

The invention further provides a server computer system comprising a processor, a storage device connected to the processor and a set of instructions stored on the storage device and readable by a processor to execute a method of providing an answer, including receiving a criteria, identifying a subset of a set of answers in a data store based on the criteria, calculating a random value for each of the answers in the subset, ranking the subset of answers based on the random values, selecting one of the answers of the subset based on the ranking and providing an output including the selected answer.

BRIEF DESCRIPTION OF THE DRAWINGS

The invention is further described by way of examples with reference to the accompanying drawings, wherein:

FIGS. 1A-1D are a flow chart showing a method of providing an answer, according to an embodiment of the invention;

FIGS. 2A-2H show views on a display of a mobile device, according to the invention;

DETAILED DESCRIPTION OF THE INVENTION

Figure 1A:
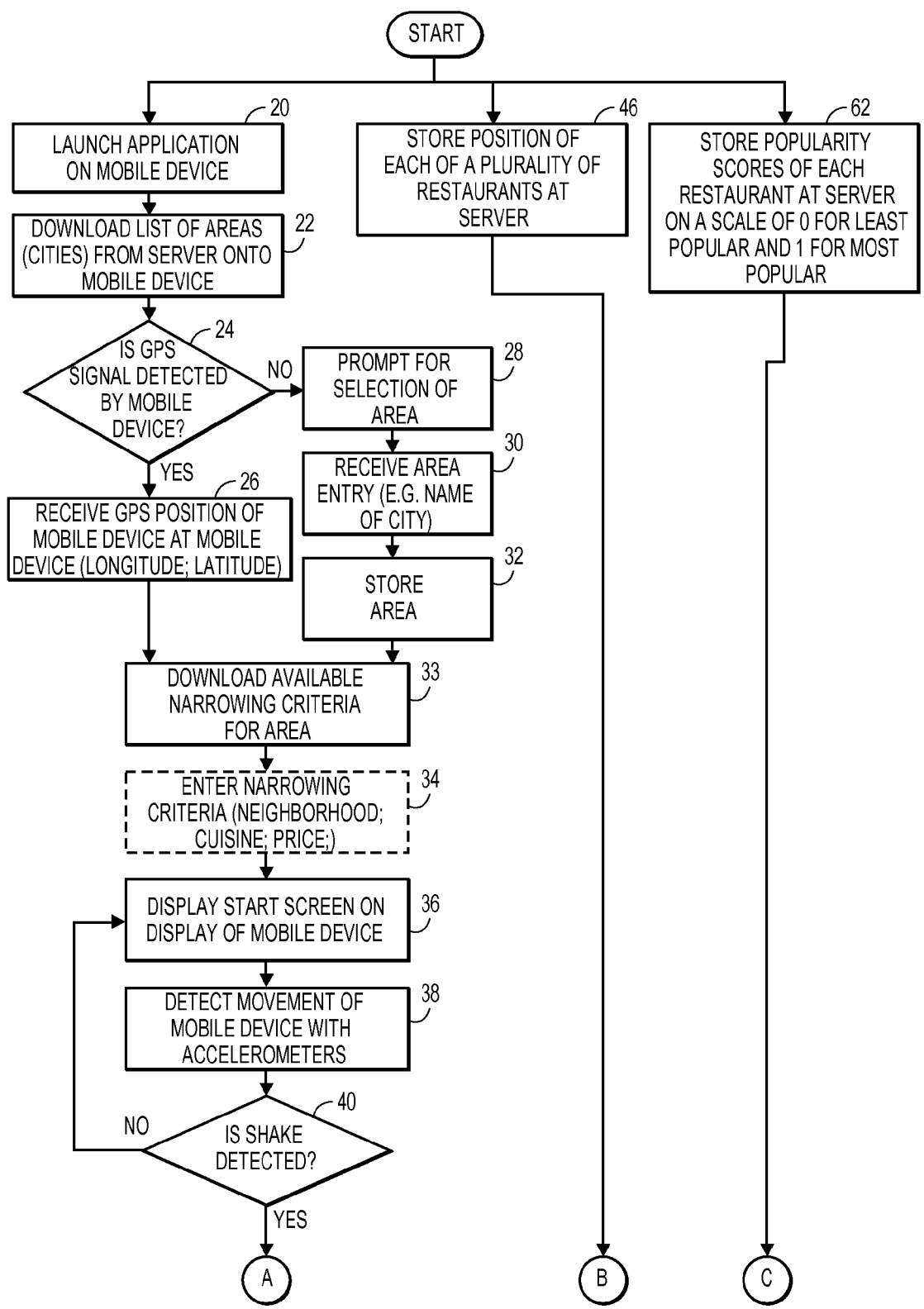
Figure 1B:
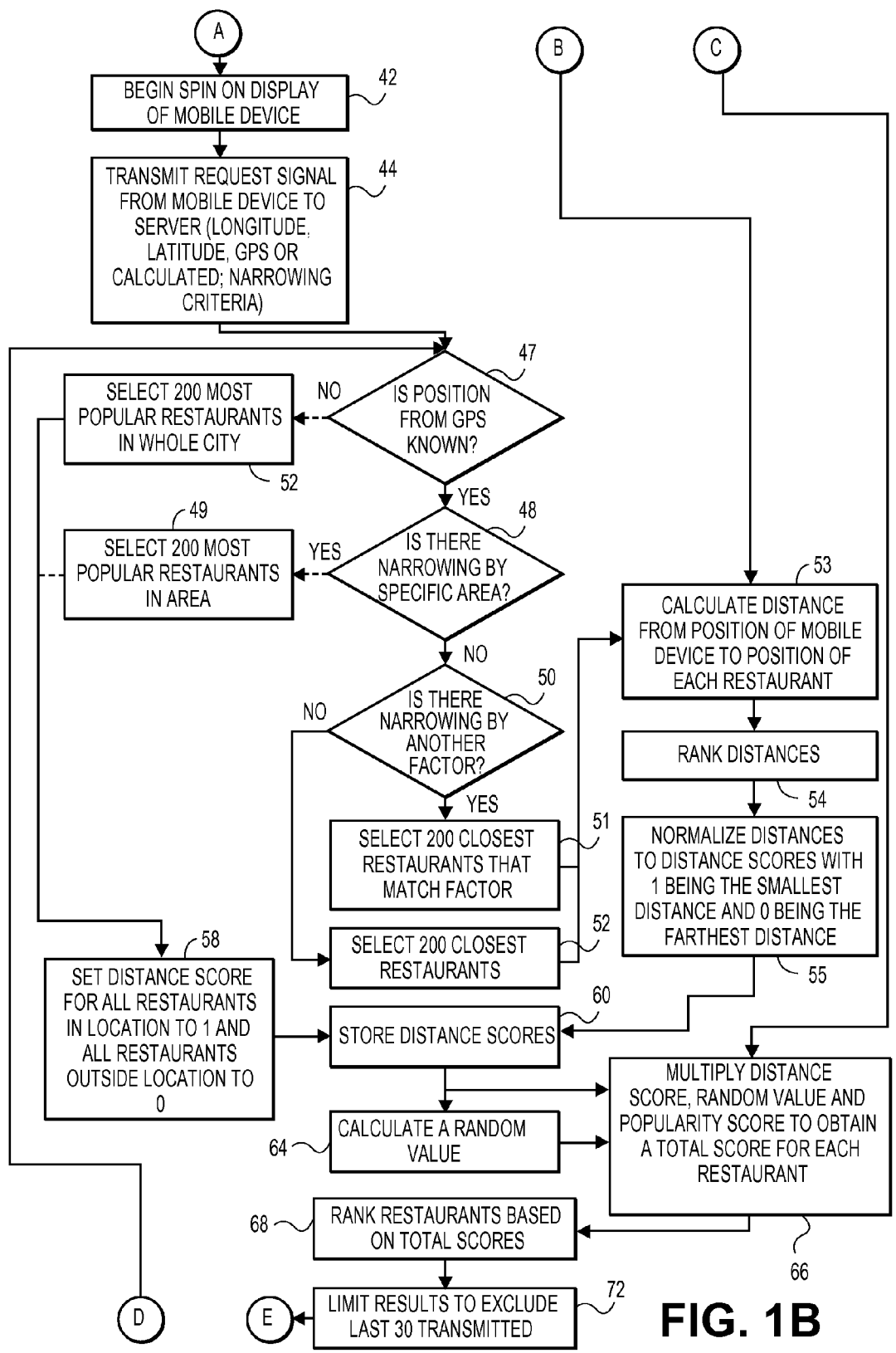
Figure 1D:
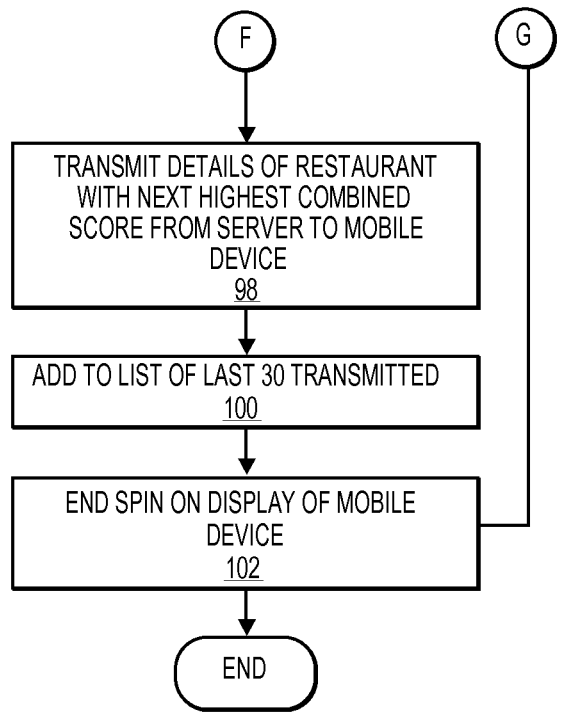

FIG. 1 of the accompanying drawings illustrates a method for providing an answer, according to an embodiment of the invention. An application is launched on a mobile device (20) and a list of areas (cities) is immediately downloaded from a server onto the mobile device by the application (22). The application then determines whether a Global Positioning System (GPS) signal is detected by the mobile device (24). The term "GPS" should be broadly interpreted herein. For example, a global position can be determined from GPS satellites, from a nearest cell phone tower, or from a nearest wireless access point.

Should a GPS signal be detected, then the GPS position of the mobile device is received at the mobile device (26). The GPS position may for example be signals that are received from a number of satellites and are calculated by the mobile device to determine the position of the mobile device, including longitude and latitude.

If a GPS signal is not detected by the mobile device, a user is prompted on a display of the mobile device to select an area (28). The area selected from the list that has previously been downloaded from the server (22). The user then selects an area so that the area is received by the mobile device (30). The mobile device then stores the selected area in memory (32).

Available narrowing criteria are then downloaded for the area (33). Once the location is determined (26 or 32), the mobile device sends a signal to the server, and the server replies with the narrowing criteria that is available. For example, if the mobile device is in Seattle, the server sends a list of Seattle neighborhoods to the mobile device. If the mobile device is in California, only a list of California cuisine is downloaded.

Following the receipt and calculation of the GPS position (26) or storing of the area (32), the user can then optionally enter a narrowing criteria (34). The example that will be provided is for selecting a restaurant. A narrowing criteria for selection of a restaurant may be for example be neighborhood, cuisine and/or price.

Following optional entering of the narrowing criteria (34), a start screen is displayed on the mobile device (36). The mobile device then continuously detects movement of the mobile device with accelerometers forming part of the mobile device. The mobile device continuously makes a determination whether shake is detected by the mobile device (40). If shake of the mobile device is not detected, the start screen is continuously displayed. Shake can for example be detected by measuring a difference in movement between axes. There may for example be accelerometers measuring movement in three orthogonal directions—x, y and z. During upward movement, one or more of those axes will register the force of the motion. As time passes, the application calculates the difference between the current force and the previous force for each axis. A positive change indicates that the mobile device is moving "up" along that axis. A negative change indicates that the mobile device is moving "down" along that axis. Changes in sign indicate that the mobile device was moving up along that axis and is now moving down, or vice versa. A shake event is generated when detecting 11 sign changes, which corresponds roughly to three shakes back and forth. Only sign changes that occur within a predetermined, relatively short period of time of one second count toward the 11 sign changes that generate a shake event, so that a shake event is not generated because of old sign changes.

The start screen includes a wheel and, if a determination is made that the acceleration is more than the predetermined threshold, a wheel begins to spin on the display of the mobile device (42). A request signal is then immediately transmitted from a mobile device to the server (44). The request signal includes the longitude and latitude of the mobile device, an indication as to whether a location of the mobile device is based on a GPS position or whether it is based on a selected area, and any narrowing criteria that may have been entered by the user onto the mobile device.

A position for each of a plurality of restaurants are stored at the server (46). The server thus includes a data store with a set of answers (restaurants), each with a respective longitude and latitude position associated therewith. The server makes a determination whether the position of the mobile device is based on a GPS position or a selected area (47). If a GPS position is known (47), then the server determines whether there is narrowing by a specific area (48). If there is narrowing by a specific area, the server selects the 200 most popular restaurants in the area (49). If the server determines that there is no narrowing by a specific area (48), then the server determines whether there is narrowing by another factor (50). If there is narrowing by a another factor (50), the server selects the 200 closest restaurants that match that factor (51). Only restaurants that comply with any narrowing criteria such as neighborhood, cuisine and/or price are included in a subset, and all other restaurants are eliminated from the subset. If there is not any narrowing by another factor (50), the server selects the 200 closest restaurants (52). If a determination is made that the GPS position is not known (47), the server selects the 200 most popular restaurants in the whole city (53).

Following selection of the 200 restaurants that match the factor (51) or selection of the 200 closest restaurants (52) then the server calculates a distance from the position of the mobile device to the position of each restaurant (53). The server then ranks the restaurants based on their distances (54). The distances are then normalized to distance scores with 1 being the smallest distance and 0 being the farthest distance (55). The restaurants stored in the server may include thousands of restaurants and the subset of restaurants is limited to the 200 restaurants with the highest distance scores (56).

If a selection is made of the 200 most popular restaurants in the whole city (53) or a selection is made of the 200 most popular restaurants in the area (49), then the distance scores of all restaurants in the area are set to 1 and all restaurants outside the area to 0 (58). All restaurants within the selected area thus have the same distance scores and all restaurants outside the area have the same distance scores.

The distance scores are stored in memory of the server (60). Each one of the restaurants then has its own distance score associated therewith.

A popularity score of each restaurant is also stored at the server (62). The popularity scores are typically normalized on a scale of 0 for the least popular restaurant to 1 for the most popular restaurant and all fractions in between. Each restaurant therefore has its own popularity score associated therewith.

A random value is then calculated for each restaurant (64). The random values are all on the same scale, for example from 0 to 1 and all fractions in between. Numerous techniques exist in the art for calculating a random value. Each restaurant in the subset thus has its own random value associated therewith, in addition to a popularity score and a distance score. The random value of a restaurant typically changes each time that it is calculated.

The distance score, random value and popularity score for each restaurant are then multiplied (combined) with one another to obtain a total score for each restaurant (66). The restaurants are then ranked based on the total scores associated with each restaurant (68).

All restaurants previously identified by the user of the mobile device as undesirable (for example by clicking on a selector "I don't like") are excluded from the list. Personal preference therefore trumps the wisdom of the crowds. The restaurants are then limited to exclude the last 30 (or other predetermined number) of restaurants that have been transmitted as answers (72). A list is stored in memory in the mobile device that includes the last 30 restaurants that have been transmitted. The mobile device transmits the list to the server every time a search is made.

The restaurant with the highest combined score is then transmitted from the server to the mobile device (76). The last restaurant that has been provided as an answer to the mobile device is then added to the list of the last 30 restaurants transmitted to the mobile device (78). The restaurant that has been transmitted will thus be excluded in any future transmissions (72). The restaurant with the highest combined score is transmitted in a response signal, i.e. in response to a request signal transmitted from the mobile device (44).

The response signal is received by the mobile device and the mobile device then stops the spinning of the wheel on the display of the mobile device (80). The spinning of the wheel serves the function of providing time for the server to calculate an answer and provide a response signal. The details of the last restaurant received from the server are then displayed on the display of the mobile device (82). The user has thus automatically been provided with an answer that is based on criteria such as location, neighborhood, cuisine and price and in part random.

The wheel is displayed together with the answer on the display of the mobile device. The user can then optionally enter narrowing criteria by rotating the wheel (84). The user may for example add or modify a narrowing criteria such as neighborhood, cuisine and/or price.

The mobile device continues to detect movement of the mobile device with the accelerometer (86). A determination is continuously made whether the acceleration is more than the predetermined threshold (88). If the acceleration is not more than the predetermined threshold, the last restaurant received from the server is still displayed on the mobile device (82). If the acceleration is more than the predetermined threshold, the wheel again begins to spin on the mobile device (90) and a request signal is transmitted from the mobile device to the server (92).

The request signal includes the narrowing criteria if the narrowing criteria has been entered by the user (84). The server then determines whether a narrowing criteria has been received that is different from the narrowing criteria on which the previously transmitted restaurant is based i.e., the server determines whether the narrowing criteria that has newly been entered (84) has changed (94). If new narrowing criteria has been received by the server, a determination is again made whether the position of the mobile device is based on a GPS position or is a selected area (47) and random values are again calculated for each restaurant (64). A new list of restaurants is thus calculated and the restaurant ranked highest on the list is transmitted from the server to the mobile device (76).

If the server determines that new narrowing criteria is not received (94), then the server determines whether there are any restaurants remaining in the subset (96). The server then transmits the details of the restaurant with the next highest combined score from the server to the mobile device (98). The restaurant that has newly been transmitted is then added to the list of the last 30 restaurants transmitted (100).

The transmitted signal that includes the next restaurant on the list is then received by the mobile device. The mobile device then ends the spin of the wheel on the display of the mobile device (102). The mobile device then displays the details of the last restaurant received from the server on the display of the mobile device (82).

FIG. 2A shows a view of the application that is displayed on a touch-sensitive display system (hereinafter "display") of the mobile device. The view of FIG. 2A is displayed when a GPS position is received and calculated by the mobile device (26 in FIG. 1). The view included an override button 202 that can be selected by a user to receive a prompt for selection of an area (28 in FIG. 1).

Figure 2C:
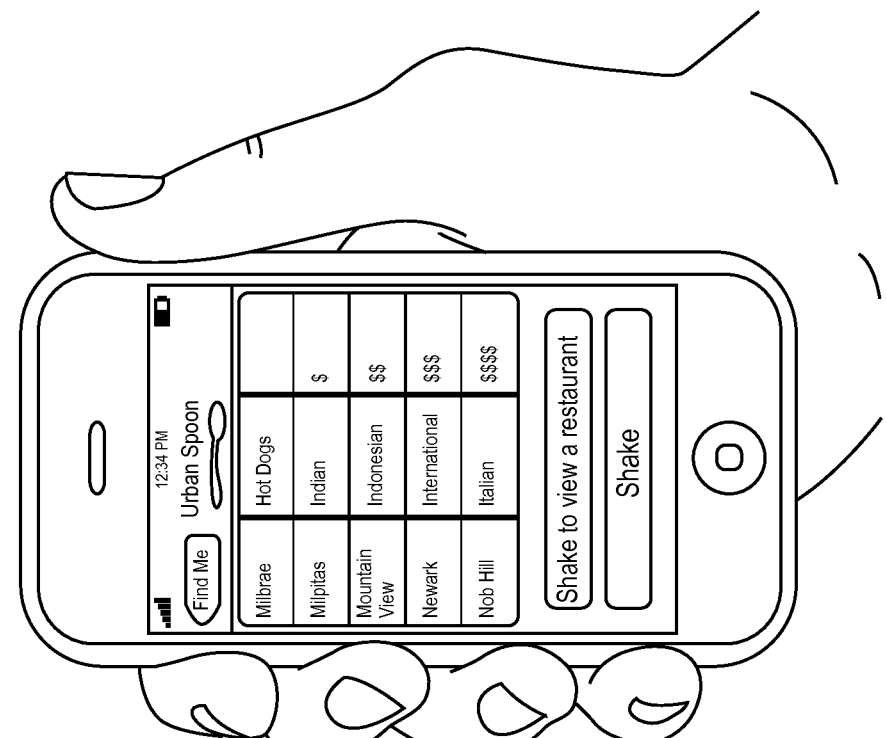
Figure 2D:
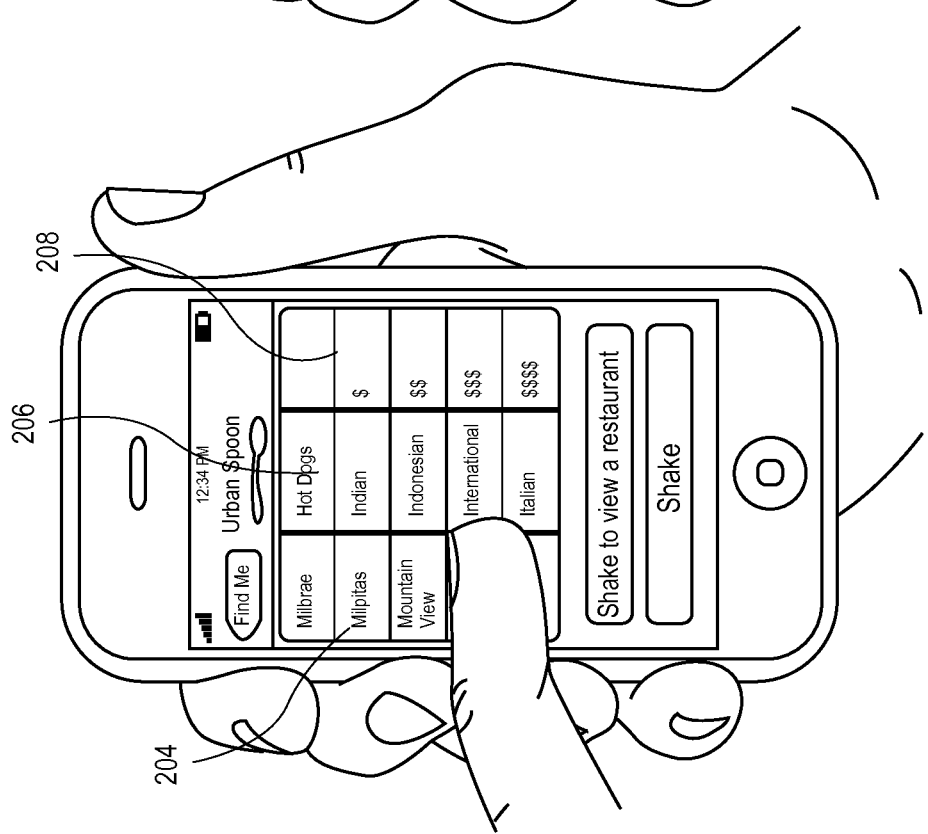

FIG. 2B shows a view on the display with three wheels 204, 206 and 208 for selecting neighborhood, cuisine and price, respectively. In FIG. 2C the user can optionally enter a narrowing criteria by rotating one or more of the wheels 204, 206 and/or 208. The wheels are rotated by touching the display and moving a finger up or down on the wheel (34 in FIG. 1). FIG. 2D shows the view after the user has rotated one or more of the wheels 204, 206 and/or 208. The user can then shake the mobile device to spin the wheels 204, 206 and 208 (42 in FIG. 1).

Figure 2F:
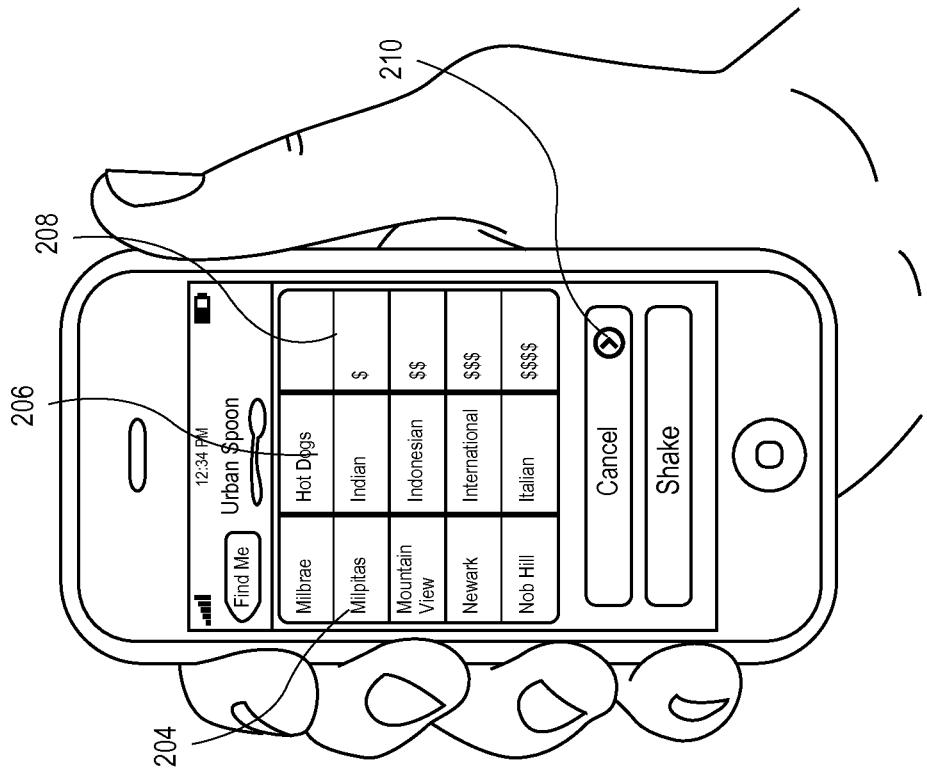
Figure 2E:
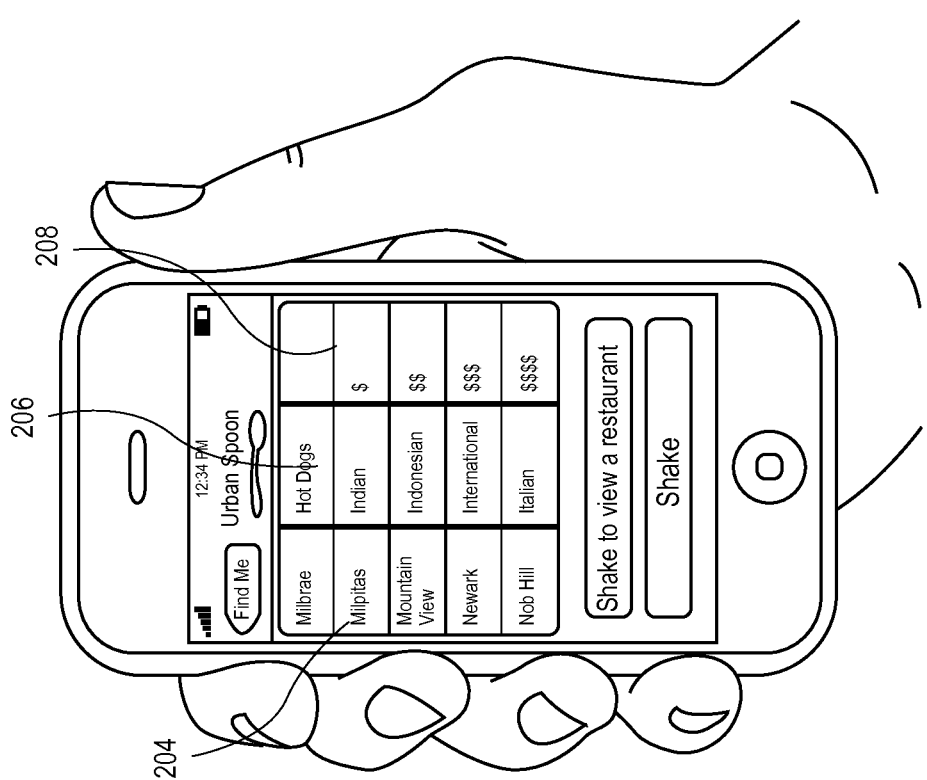

FIG. 2E shows the view of the display after a response signal is received by the mobile device (76 in FIG. 1) and the wheels 204, 206 and 208 stop spinning. The wheel 206 stops spinning a second or so after the wheel 204, followed by the wheel 208 a second or so after the wheel 206. As shown in FIG. 2F, the selected restaurant 210 is then displayed in a view on the mobile device (82 in FIG. 1).

Figure 2H:
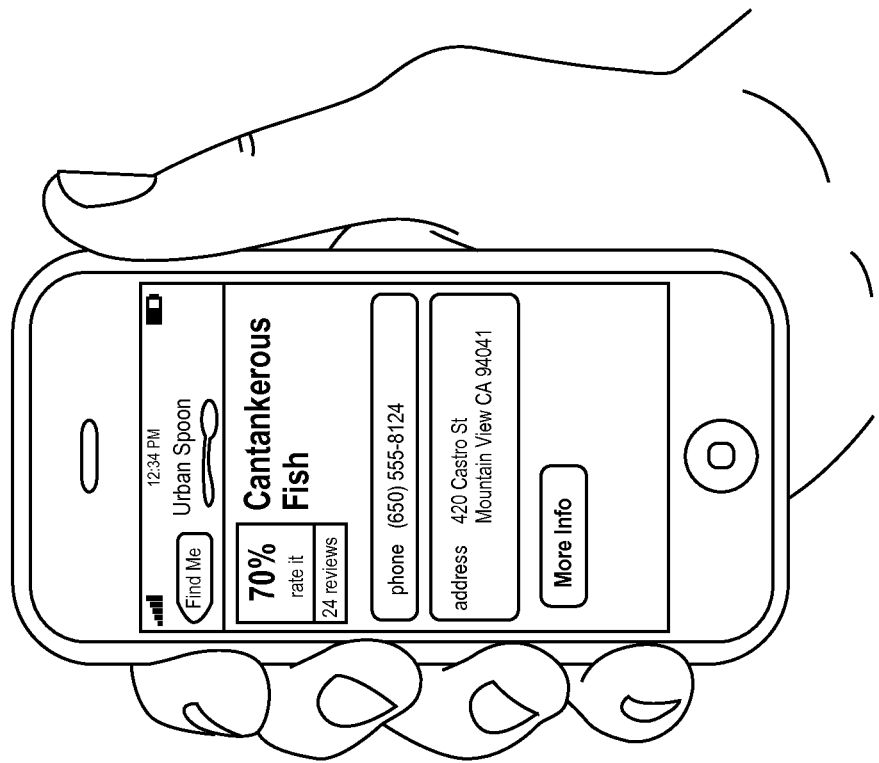
Figure 2G:
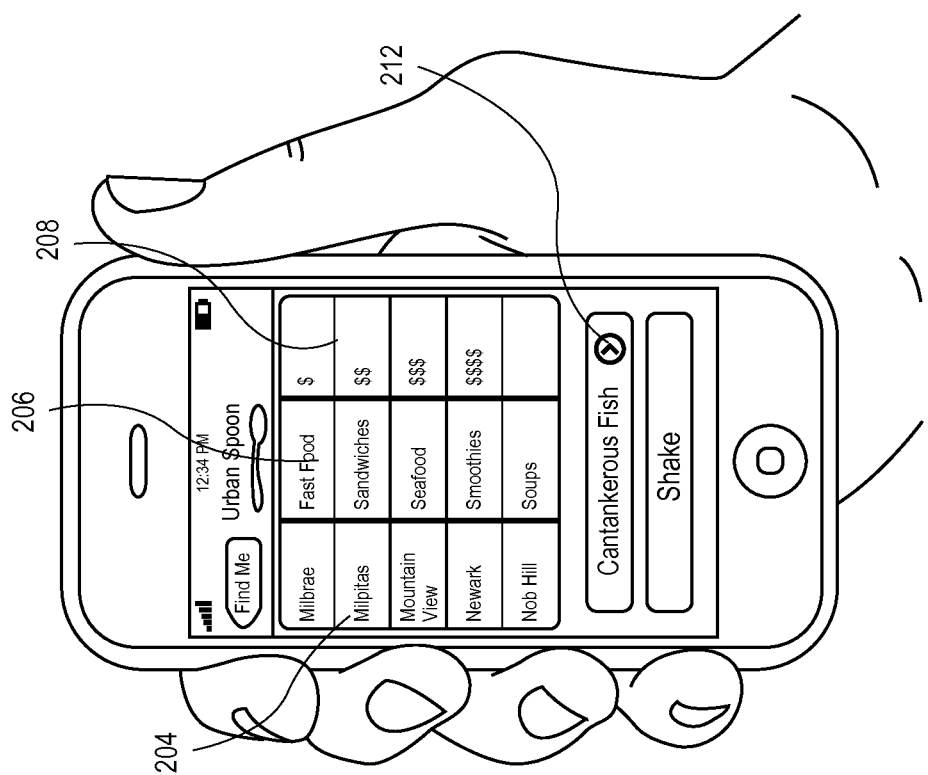

FIG. 2G shows a view of the mobile device after the user has again shaken the mobile device and details of a restaurant 212 having the next highest combined score is displayed on the mobile device (98 in FIG. 1).

FIG. 2H displays a view on the mobile device after the user has selected the restaurant 212 in FIG. 2G. The view 2H includes the name, phone number and street address of the restaurant. Other details of the restaurant such as its popularity may also be displayed.

Figure 3:
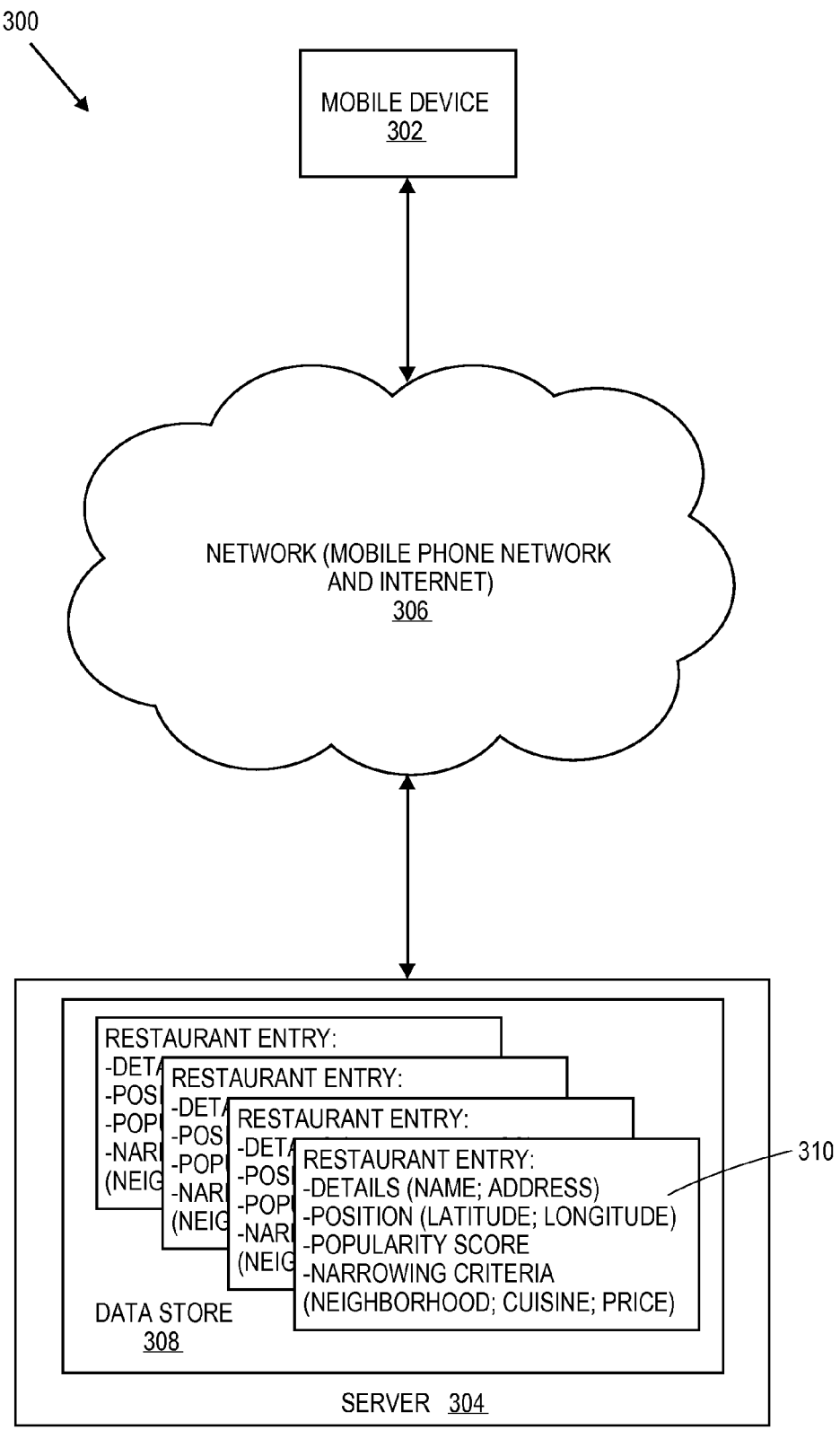
FIG. 3 is a block diagram of a network system, according to the invention.

FIG. 3 shows a network system including a mobile device 302, a server 304 and a network 306. The server 304 and the mobile device 302 are connected to one another over the network 306. The network 306 typically includes a number of networks, including a mobile phone network and the internet. The server 306 includes a data store 308 with a number of restaurant entries 310 stored therein. Each restaurant entry includes details of the entry such as the name and address, the position of the entry in latitude and longitude, its popularity score and narrowing criteria like neighborhood, cuisine and price. The restaurant entries form a set of answers in the data store 308.

Figure 4:
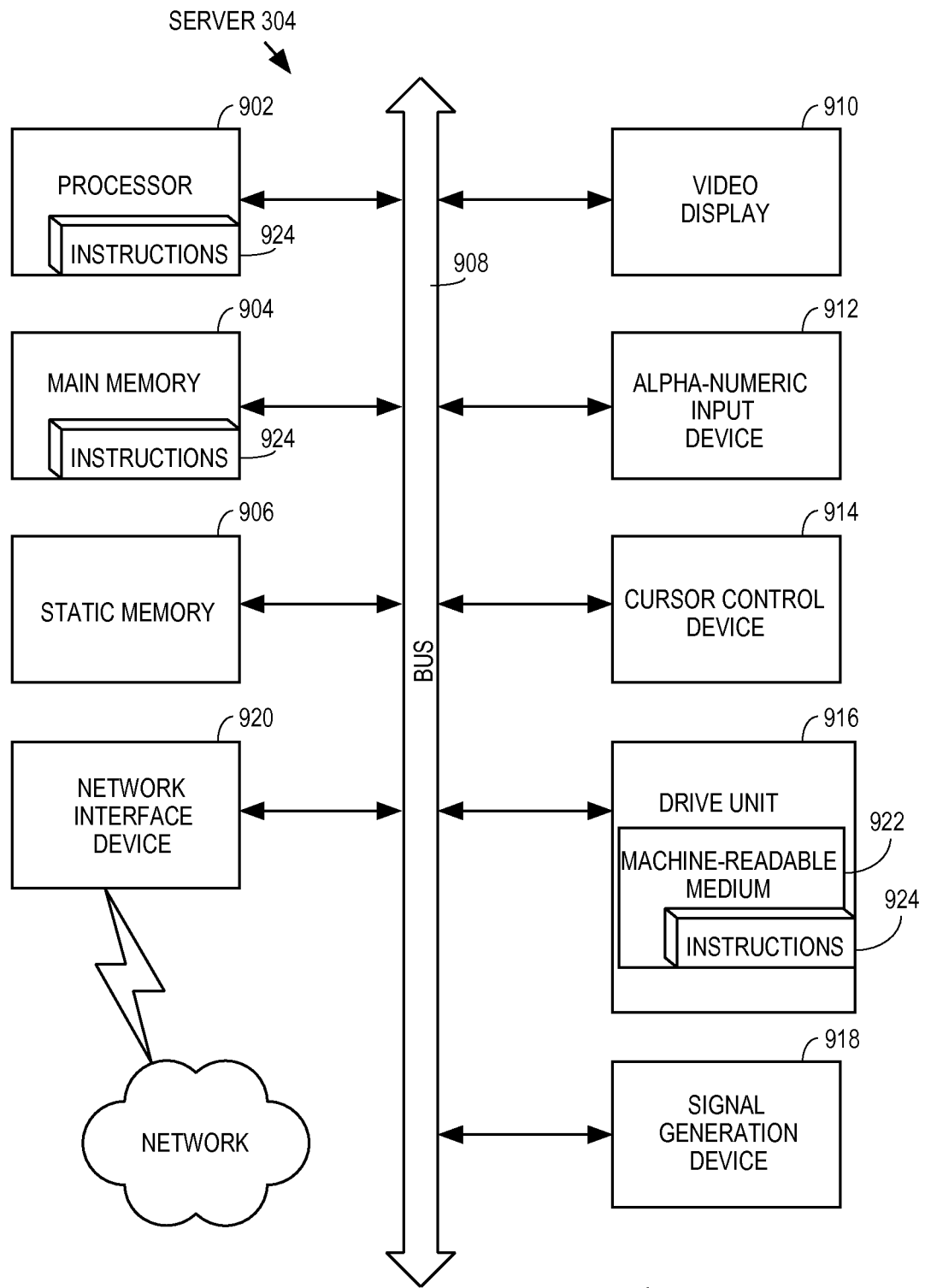
FIG. 4 is a block diagram of a machine in the form of a computer system that may form a server forming part of the network system.

FIG. 4 shows a machine 304 in the exemplary form of the server 304 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It should be understood that "computer system" as used herein can comprise a single computer or multiple computers that are connected to one another over a network.

Figure 5:
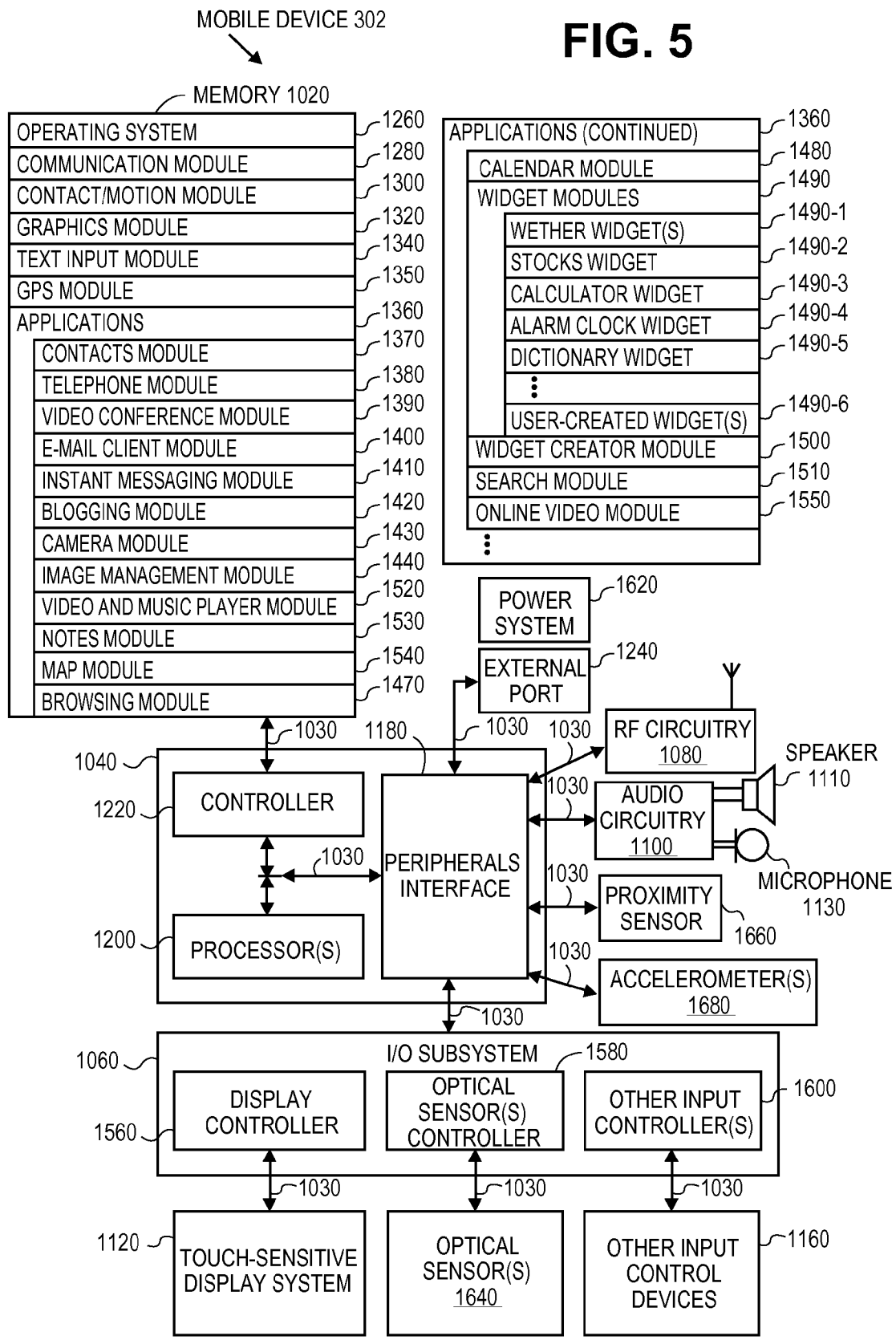
FIG. 5 is block diagram of mobile device that may form part of the network system.

FIG. 5 is a block diagram illustrating mobile device 302 with touch-sensitive displays 112. The touch-sensitive display 1120 is sometimes called a "touch screen" for convenience, and may also be known as or called a touch-sensitive display system. The mobile device 302 may include a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160, and an external port 1240. The mobile device 302 may include one or more optical sensors 1640. These components may communicate over one or more communication buses or signal lines 1030.

It should be appreciated that the mobile device 302 is only one example of a mobile device 302, and that the mobile device 302 may have more or fewer components than shown, may combine two or more components, or a may have a different configuration or arrangement of the components. The various components shown in FIG. 5 may be implemented in hardware, software or a combination of both hardware and software, including one or more signal processing and/or application specific integrated circuits.

Memory 1020 may include high-speed random access memory and may also include non-volatile memory, such as one or more magnetic disk storage devices, flash memory devices, or other non-volatile solid-state memory devices. Access to memory 1020 by other components of the mobile device 302, such as the CPU 1200 and the peripherals interface 1180, may be controlled by the memory controller 1220.

The peripherals interface 1180 couples the input and output peripherals of the device to the CPU 120 and memory 1020. The one or more processors 1200 run or execute various software programs and/or sets of instructions stored in memory 1020 to perform various functions for the mobile device 302 and to process data.

In some embodiments, the peripherals interface 1180, the CPU 1200, and the memory controller 1220 may be implemented on a single chip, such as a chip 1040. In some other embodiments, they may be implemented on separate chips.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 1100, the speaker 1110, and the microphone 1130 provide an audio interface between a user and the mobile device 302. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. Audio data may be retrieved from and/or transmitted to memory 1020 and/or the RF circuitry 1080 by the peripherals interface 1180. In some embodiments, the audio circuitry 1100 also includes a headset jack. The headset jack provides an interface between the audio circuitry 1100 and removable audio input/output peripherals, such as output-only headphones or a headset with both output (e.g., a headphone for one or both ears) and input (e.g., a microphone).

The I/O subsystem 1060 couples input/output peripherals on the mobile device 302, such as the touch screen 1120 and other input/control devices 1160, to the peripherals interface 1180. The I/O subsystem 1060 may include a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth. In some alternate embodiments, input controller(s) 1600 may be coupled to any (or none) of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile device 302 on or off. The user may be able to customize a functionality of one or more of the buttons. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

A touch-sensitive display in some embodiments of the touch screen 1120 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 1120 displays visual output from the mobile device 302, whereas touch sensitive tablets do not provide visual output.

A touch-sensitive display in some embodiments of the touch screen 1120 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 1120 may have a resolution in excess of 100 dpi. In an exemplary embodiment, the touch screen has a resolution of approximately 160 dpi. The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile device 302 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 1120 or an extension of the touch-sensitive surface formed by the touch screen.

In some embodiments, the mobile device 302 may include a physical or virtual click wheel as an input control device 1160. A user may navigate among and interact with one or more graphical objects (henceforth referred to as icons) displayed in the touch screen 1120 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 1600 as well as one or more of the modules and/or sets of instructions in memory 1020. For a virtual click wheel, the click wheel and click wheel controller may be part of the touch screen 1120 and the display controller 1560, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile device 302 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile device 302 may also include one or more optical sensors 1640. FIG. 5 show an optical sensor coupled to an optical sensor controller 1580 in I/O subsystem 1060. The optical sensor 1640 may include charge-coupled device (CCD) or complementary metal-oxide semiconductor (CMOS) phototransistors. The optical sensor 1640 receives light from the environment, projected through one or more lens, and converts the light to data representing an image. In conjunction with an imaging module 1430 (also called a camera module), the optical sensor 1640 may capture still images or video. In some embodiments, an optical sensor is located on the back of the mobile device 302, opposite the touch screen display 1120 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 1640 can be changed by the user (e.g., by rotating the lens and the sensor in the device housing) so that a single optical sensor 1640 may be used along with the touch screen display for both video conferencing and still and/or video image acquisition.

The mobile device 302 may also include one or more proximity sensors 1660. FIG. 5 show a proximity sensor 166 coupled to the peripherals interface 1180. Alternately, the proximity sensor 1660 may be coupled to an input controller 1600 in the I/O subsystem 1060. The proximity sensor 1660 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 1120 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The mobile device 302 may also include one or more accelerometers 1680. FIG. 5 shows an accelerometer 1680 coupled to the peripherals interface 1180. Alternately, the accelerometer 1680 may be coupled to an input controller 1600 in the I/O subsystem 1060. The accelerometer 1680 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 1020 may include an operating system 1260, a communication module (or set of instructions) 1280, a contact/motion module (or set of instructions) 1300, a graphics module (or set of instructions) 1320, a text input module (or set of instructions) 1340, a Global Positioning System (GPS) module (or set of instructions) 1350, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 1300 and the display controller 1560 also detects contact on a touchpad. In some embodiments, the contact/motion module 1300 and the controller 1600 detects contact on a click wheel.

The graphics module 1320 includes various known software components for rendering and displaying graphics on the touch screen 1120, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 1340, which may be a component of graphics module 1320, provides soft keyboards for entering text in various applications (e.g., contacts 1370, e-mail 1400, IM 141, blogging 1420, browser 1470, and any other application that needs text input).

The GPS module 1350 determines the location of the device and provides this information for use in various applications (e.g., to telephone 1380 for use in location-based dialing, to camera 1430 and/or blogger 1420 as picture/video metadata, and to applications that provide location-based services such as weather widgets, local yellow page widgets, and map/navigation widgets).

The applications 1360 may include the following modules (or sets of instructions), or a subset or superset thereof:

a contacts module 1370 (sometimes called an address book or contact list);
a telephone module 1380;
a video conferencing module 1390;
an e-mail client module 1400;
an instant messaging (IM) module 1410;
a blogging module 1420;
a camera module 1430 for still and/or video images;
an image management module 1440;
a video player module 1450;
a music player module 1460;
a browser module 1470;
a calendar module 1480;
widget modules 1490, which may include weather widget 1490-1, stocks widget 1490-2, calculator widget 1490-3, alarm clock widget 1490-4, dictionary widget 1490-5, and other widgets obtained by the user, as well as user-created widgets 1490-6;
widget creator module 1500 for making user-created widgets 1490-6;
search module 1510;
video and music player module 1520, which merges video player module 1450 and music player module 1460;
notes module 1530; and/or map module 1540; and/or
online video module 1550.

Examples of other applications 1360 that may be stored in memory 1020 include other word processing applications, JAVA-enabled applications, encryption, digital rights management, voice recognition, and voice replication.

In conjunction with touch screen 1120, display controller 1560, contact module 1300, graphics module 1320, and text input module 1340, the contacts module 1370 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1380, video conference 1390, e-mail 1400, or IM 1410; and so forth. Embodiments of user interfaces and associated processes using contacts module 1370 are described further below.

In conjunction with RF circuitry 1080, audio circuitry 1100, speaker 1110, microphone 1130, touch screen 1120, display controller 1560, contact module 1300, graphics module 1320, and text input module 1340, the telephone module 1380 may be used to enter a sequence of characters corresponding to a telephone number, access one or more telephone numbers in the address book 1370, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 1380 are described further below.

In conjunction with RF circuitry 1080, audio circuitry 1100, speaker 1110, microphone 1130, touch screen 1120, display controller 1560, optical sensor 1640, optical sensor controller 1580, contact module 1300, graphics module 1320, text input module 1340, contact list 1370, and telephone module 1380, the videoconferencing module 1390 may be used to initiate, conduct, and terminate a video conference between a user and one or more other participants. Embodiments of user interfaces and associated processes using videoconferencing module 1390 are described further below.

In conjunction with RF circuitry 1080, touch screen 1120, display controller 1560, contact module 1300, graphics module 1320, and text input module 1340, the e-mail client module 1400 may be used to create, send, receive, and manage e-mail. In conjunction with image management module 1440, the e-mail module 1400 makes it very easy to create and send e-mails with still or video images taken with camera module 1430. Embodiments of user interfaces and associated processes using e-mail module 1400 are described further below.

In conjunction with RF circuitry 1080, touch screen 1120, display controller 1560, contact module 1300, graphics module 1320, and text input module 1340, the instant messaging module 1410 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 1410 are described further below.

In conjunction with RF circuitry 1080, touch screen 1120, display controller 1560, contact module 1300, graphics module 1320, text input module 1340, image management module 1440, and browsing module 1470, the blogging module 1420 may be used to send text, still images, video, and/or other graphics to a blog (e.g., the user's blog). Embodiments of user interfaces and associated processes using blogging module 1420 are described further below In conjunction with touch screen 1120, display controller 1560, optical sensor(s) 1640, optical sensor controller 1580, contact module 1300, graphics module 1320, and image management module 1440, the camera module 1430 may be used to capture still images or video (including a video stream) and store them into memory 1020, modify characteristics of a still image or video, or delete a still image or video from memory 1020. Embodiments of user interfaces and associated processes using camera module 1430 are described further below.

In conjunction with touch screen 1120, display controller 1560, contact module 1300, graphics module 1320, text input module 1340, and camera module 1430, the image management module 1440 may be used to arrange, modify or otherwise manipulate, label, delete, present (e.g., in a digital slide show or album), and store still and/or video images. Embodiments of user interfaces and associated processes using image management module 1440 are described further below.

In conjunction with touch screen 1120, display controller 1560, contact module 1300, graphics module 1320, audio circuitry 1100, and speaker 1110, the video player module 1450 may be used to display, present or otherwise play back videos (e.g., on the touch screen or on an external, connected display via external port 1240). Embodiments of user interfaces and associated processes using video player module 1450 are described further below.

In conjunction with touch screen 1120, display system controller 1560, contact module 1300, graphics module 1.320, audio circuitry 1100, speaker 1110, RF circuitry 1080, and browser module 1470, the music player module 1460 allows the user to download and play back recorded music and other sound files stored in one or more file formats, such as MP3 or AAC files. In some embodiments, the mobile device 302 may include the functionality of an MP3 player, such as an iPod (trademark of Apple Computer, Inc.). Embodiments of user interfaces and associated processes using music player module 1460 are described further below.

In conjunction with RF circuitry 1080, touch screen 1120, display system controller 1560, contact module 1300, graphics module 1320, and text input module 1340, the browser module 1470 may be used to browse the Internet, including searching, linking to, receiving, and displaying web pages or portions thereof, as well as attachments and other files linked to web pages. Embodiments of user interfaces and associated processes using browser module 1470 are described further below.

In conjunction with RF circuitry 1080, touch screen 1120, display system controller 1560, contact module 1300, graphics module 1320, text input module 1340, e-mail module 1400, and browser module 1470, the calendar module 1480 may be used to create, display, modify, and store calendars and data associated with calendars (e.g., calendar entries, to do lists, etc.). Embodiments of user interfaces and associated processes using calendar module 1480 are described further below.

In conjunction with RF circuitry 1080, touch screen 1120, display system controller 1560, contact module 1300, graphics module 1320, text input module 1340, and browser module 1470, the widget modules 1490 are mini-applications that may be downloaded and used by a user (e.g., weather widget 1490-1, stocks widget 1490-2, calculator widget 1490-3, alarm clock widget 1490-4, and dictionary widget 1490-5) or created by the user (e.g., user-created widget 1490-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 1490 are described further below.

In conjunction with RF circuitry 1080, touch screen 1120, display system controller 1560, contact module 1300, graphics module 1320, text input module 1340, and browser module 1470, the widget creator module 1500 may be used by a user to create widgets (e.g., turning a user-specified portion of a web page into a widget). Embodiments of user interfaces and associated processes using widget creator module 1500 are described further below.

In conjunction with touch screen 1120, display system controller 1560, contact module 1300, graphics module 1320, and text input module 1340, the search module 1510 may be used to search for text, music, sound, image, video, and/or other files in memory 1020 that match one or more search criteria (e.g., one or more user-specified search terms). Embodiments of user interfaces and associated processes using search module 1510 are described further below.

In conjunction with touch screen 1120, display controller 1560, contact module 1300, graphics module 1320, and text input module 1340, the notes module 1530 may be used to create and manage notes, to do lists, and the like. Embodiments of user interfaces and associated processes using notes module 1530 are described further below.

In conjunction with RF circuitry 1080, touch screen 1120, display system controller 1560, contact module 1300, graphics module 1320, text input module 1340, GPS module 1350, and browser module 1470, the map module 1540 may be used to receive, display, modify, and store maps and data associated with maps (e.g., driving directions; data on stores and other points of interest at or near a particular location; and other location-based data). Embodiments of user interfaces and associated processes using map module 1540 are described further below.

In conjunction with touch screen 1120, display system controller 1560, contact module 1300, graphics module 1320, audio circuitry 1100, speaker 1110, RF circuitry 1080, text input module 1340, e-mail client module 1400, and browser module 1470, the online video module 1550 allows the user to access, browse, receive (e.g., by streaming and/or download), play back (e.g., on the touch screen or on an external, connected display via external port 1240), send an e-mail with a link to a particular online video, and otherwise manage online videos in one or more file formats, such as H.264. In some embodiments, instant messaging module 1410, rather than e-mail client module 1400, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 1450 may be combined with music player module 1460 into a single module (e.g., video and music player module 1520). In some embodiments, memory 1020 may store a subset of the modules and data structures identified above. Furthermore, memory 1020 may store additional modules and data structures not described above.

In some embodiments, the mobile device 302 is a device where operation of a predefined set of functions on the device is performed exclusively through a touch screen 1120 and/or a touchpad. By using a touch screen and/or a touchpad as the primary input/control device for operation of the mobile device 302, the number of physical input/control devices (such as push buttons, dials, and the like) on the mobile device 302 may be reduced.

The predefined set of functions that may be performed exclusively through a touch screen and/or a touchpad include navigation between user interfaces. In some embodiments, the touchpad, when touched by the user, navigates the mobile device 302 to a main, home, or root menu from any user interface that may be displayed on the mobile device 302. In such embodiments, the touchpad may be referred to as a "menu button." In some other embodiments, the menu button may be a physical push button or other physical input/control device instead of a touchpad.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of providing an answer, comprising:
storing a plurality of answers in a data store;
receiving at least a position of a mobile device;
identifying at least a first subset from the answers in the data store based on the position;
calculating at least a first random value for each of the answers in the first subset wherein the random value is different each time that it is calculated;
selecting at least one of the answers of the first subset, wherein the selection is at least in part based on randomness which causes the selection to be different every time that the same first data set is identified in response to the receiving of the position; and
providing at least a first output including the selected answer.

2. The method of claim 1, wherein the position is a GPS position of a mobile device.

3. The method of claim 1 further comprising:
calculating at least a first random value for each of the answers in the first subset wherein the random value is different each time that it is calculated;
ranking the first subset of answers based on at least the random values, wherein the selection of the at least one answer of the first subset is based on the ranking of the first subset.

4. The method of claim 3, further comprising:
receiving at least a first request signal including the first criteria of a network at a server; and
transmitting at least a first response signal including the selected answer of the first subset in response to the request signal wherein the random value is calculated in response to receiving the request signal and before transmitting the response signal.

5. The method of claim 4, further comprising:
receiving at least a first narrowing criteria, the first subset of answers being identified based on the first narrowing criteria.

6. The method of claim 5, wherein the first narrowing criteria includes at least one of neighborhood, cuisine and price.

7. The method of claim 5, further comprising:
receiving at least a second narrowing criteria;
identifying at least a second subset of a set of answers in a data store based on the second narrowing criteria;
calculating at least a second random value for each of the answers in the second subset wherein the second random values are calculated in response to receiving the second narrowing criteria wherein the second random value is different than the first random value for a particular one of the answers;
ranking the second subset of answers based on the second total scores;
selecting one of the answers of the second subset based on the ranking of the second subset; and
providing at least a second output including the selected answer of the second subset.

8. The method of claim 3, further comprising:
storing a position of each of the answers of the set;
calculating a distance from the position of the mobile device to a position of each answer to determine a plurality of distances;
obtaining a plurality of distance scores based on a ranking of the distances;
storing the distance scores, wherein the at least one answer is at least in part selected based on the distance scores.

9. The method of claim 7, further comprising:
obtaining a total score for each answer by combining the distance score and the random value for each answer;
ranking the first subset of answers based on at least the total scores, wherein the selection of the at least one answer of the first subset is based on the ranking of the first subset based on the total scores.

10. The method of claim 3, further comprising:
storing popularity scores of each of the answers;
obtaining a total score for each answer by combining the random value and the popularity score for each answer; and
ranking the first subset of answers based on at least the total scores, wherein the selection of the at least one answer of the first subset is based on the ranking of the first subset based on the total scores.

11. The method of claim 3, wherein the selected answer is the answer in the subset having the highest ranking, further comprising:
receiving a request signal; and
in response to the request signal providing an output including a selected answer having the next highest ranking in the subset.

12. The method of claim 11, further comprising:
recording each answer that has been provided as an output; and
limiting the subset of answers to exclude a last predetermined number of answers that have been provided as an output.

13. A non-transitory computer readable medium having stored thereon a set of instructions which, when executed by a processor of a computing device caries out a method of providing an answer, comprising:
storing a plurality of answers in a data store;
receiving at least a position of a mobile device;
identifying at least a first subset of a set of answers from the answers in the data store based on the position;
calculating at least a first random value for each of the answers in the first subset wherein the random value is different each time that it is calculated;
selecting at least one of the answers of the first subset, wherein the selection is at least in part based on randomness which causes the selection to be different every time that the same first data set is identified in response to the receiving of the position; and
providing at least a first output including the selected answer of the first subset in response to the first criteria.

14. A server computer system comprising:
a processor;
a storage device connected to the processor; and
a set of instructions stored on the storage device and readable by a processor to execute a method of providing an answer, comprising:
storing a plurality of answers in a data store; receiving at least a position of a mobile device;
identifying at least a first subset of a set of answers from the answers in the data store based on the position;
calculating at least a first random value for each of the answers in the first subset wherein the random value is different each time that it is calculated;
selecting at least one of the answers of the first subset, wherein the selection is at least in part based on randomness which causes the selection to be different every time that the same first data set is identified in response to the receiving of the position; and providing at least a first output including the selected answer of the first subset in response to the first criteria.

15. A method of obtaining and answer on a mobile device, comprising:

determining at least a position of the mobile device;

transmitting the position of the mobile device from the mobile device to a server, the server identifying at least a first subset of a set of answers in a data store based on the position, calculating at least a first random value for each of the answers in the first subset wherein the random value is different each time that it is calculated, selecting at least one of the answers of the first subset, wherein the selection is at least in part based on randomness which causes the selection to be different every time that the same first data set is identified in response to the receiving of the position; and receiving at least a first output from the server including the selected answer of the first subset.

16. The method of claim 15, further comprising:

utilizing a GPS module of the mobile device to determine a GPS position of the mobile device, the criteria including the GPS position of the mobile device.

17. The method of claim 15, further comprising:

detecting movement of the mobile device;

determining whether acceleration of the mobile device is more than a predetermined threshold; and if acceleration of the mobile device is more than the predetermined threshold, transmitting the position of the mobile device from the mobile device to the server.

18. The method of claim 15, further comprising:

receiving a narrowing criteria entered into the mobile device; and transmitting the narrowing criteria from the mobile device to a server, the subset of answers being based on the narrowing criteria.

19. A non-transitory computer readable medium having stored thereon a set of instructions which, when executed by a processor of a computing device caries out a method of providing an answer, comprising:

determining at least a position of the mobile device;

transmitting the position of the mobile device from the mobile device to a server, the server identifying at least a first subset of a set of answers in a data store based on the position, calculating at least a first random value for each of the answers in the first subset wherein the random value is different each time that it is calculated, selecting at least one of the answers of the first subset, wherein the selection is at least in part based on randomness which causes the selection to be different every time that the same first data set is identified in response to the receiving of the position; and receiving at least a first output from the server including the selected answer of the first subset.

20. A mobile device comprising:

a processor;

a storage device connected to the processor; and a set of instructions stored on the storage device and readable by a processor to execute a method of providing an answer, comprising:

determining at least a position of the mobile device;

transmitting the position of the mobile device from the mobile device to a server, the server identifying at least a first subset of a set of answers in a data store based on the position, calculating at least a first random value for each of the answers in the first subset wherein the random value is different each time that it is calculated, selecting at least one of the answers of the first subset, wherein the selection is at least in part based on randomness which causes the selection to be different every time that the same first data set is identified in response to the receiving of the position; and receiving at least a first output from the server including the selected answer of the first subset.

* * * * *